United States Patent [19]

Winger

[11] Patent Number: 5,319,896
[45] Date of Patent: Jun. 14, 1994

[54] APPARATUS AND METHOD FOR SECURING BUILDING DURING HIGH WIND CONDITIONS

[75] Inventor: Ronald C. Winger, 300-F Kawaihae St., Honolulu, Hi. 96825

[73] Assignees: Ronald C. Winger; Claudia J. Winger, Honolulu, Hi. ; a part interest

[21] Appl. No.: 167,518

[22] Filed: Dec. 14, 1993

[51] Int. Cl.$^5$ .............................................. E04B 7/00
[52] U.S. Cl. ................................. 52/23; 52/DIG. 11
[58] Field of Search ................ 52/3, 23, 148, DIG. 11

[56] References Cited

U.S. PATENT DOCUMENTS 2,573,987 11/1951 Sage .................................... 52/23 X Primary Examiner—Carl D. Friedman
Assistant Examiner—Creighton Smith
Attorney, Agent, or Firm—Seth M. Reiss

[57] ABSTRACT

A method for securing residential and low rise commercial structures during periods of high wind employing mooring apparatus having a mooring cable (20), a ground anchor (22), and a tightening means (24). One end of the mooring cable (20) is permanently attached to a structural roof member, the remainder being stowed with the tightening means (24) in a roof housing (26). The ground anchor (22) is strategically installed exterior to the structure. Prior to the onset of a hurricane or other high wind condition, the mooring cable (20) is released from its roof housing (26), detachably fastened to the ground anchor (22), and made taught using the tightening means (24). A number of mooring apparatus are used to secure a given structure. Different ways of housing the stowed mooring cable in different types of structures are described.

21 Claims, 4 Drawing Sheets

APPARATUS AND METHOD FOR SECURING BUILDING DURING HIGH WIND CONDITIONS

BACKGROUND OF INVENTION

1. Field of Invention

The present invention relates to securing low rise residential and commercial structures in high wind conditions including hurricanes, cyclones, and typhoons. More particularly, this invention describes mooring apparatus that are deployed from building roofs and attached to ground anchors in order to secure the roof and underlying structure during periods of high wind and inclement weather.

2. Description of the Prior Art

The threat posed by high winds to low rise structures in general, and to their roofs in particular, has long been appreciated. Recent hurricanes in Florida and Hawaii have served to underscore the threat and magnitude of the problem.

It is well known and understood that architectural design can been used to strengthen structures and render them less vulnerable to inclement weather. Geodesic domes, and to a lesser extent A-frame structures are, consequent to their shape and structural design, least susceptible among low rise structures to damage by high wind. While strong, these structures are not found aesthetically pleasing by many. Also, by virtue of their design they include much unusable interior space and occupy large amounts of land area relative to other structures.

A primary object of the present invention is to provide a means and method of securing low rise structures during periods of high wind and inclement weather without compromising the architectural aesthetics of the structure. A further object of the present invention is to provide said means and method without wasting interior structural space and without consuming unnecessary land area.

A variety of hardware has developed to protect conventional low-rise structures against the threat of high winds. This hardware, often referred to as hurricane clips, serves to strengthen the joint where structural roof members such as rafters and beams meet structural wall members such as posts. While hurricane clips help ensure that the structural frame aspects of a building do not pull apart, the clips are not capable of counterbalancing the lifting force of the wind on the structure. Accordingly, their usefulness is limited and they are only partially successful in protecting structures against hurricane and other wind damage.

A further object of the present invention is to secure roofs and structures during periods of high wind by increasing the strength of the structure through a means which counterbalances the lifting force of the wind on the roof and building structure.

Tie down devices used to secure structures against the force of high winds are also known and understood. Originally described to secure agricultural storage structures and mobile homes, tie down apparatus comprising cables, plates or straps attached to ground anchors have also been applied to secure residential structures. The known tie down devices are of two varieties, those permanently affixed to the structure and those which are attached only during periods of high wind and bad weather.

Permanently attached tie down apparatus are always in view and detract substantially from the aesthetics of the structure. Permanent tie down devices also cause a large area of space around the structure to become lost and unusable for normal activities.

Known temporary tie down devices require substantial time, tools, labor, skill and strength to assemble. A minimum of two strong adults using a ladder and other tools are required to fully deploy available tie down devices. Accordingly, these devices are cumbersome and potentially expensive to use, and of little use to the elderly, persons of living alone, and persons without appropriate tools on hand. Moreover, there is often insufficient warning of high wind conditions to permit full assembly of such apparatus even where sufficient manpower and tools are available.

A further object of the present invention is to secure roofs and low rise structures by means of a temporary tie down device which does not interfere with the everyday aesthetics of the structure nor occupy land area around the structure on a permanent basis, and which can be easily and quickly deployed and assembled by a single adult with few or no tools and a minimum of time and strength.

SUMMARY OF INVENTION

These and other objects are accomplished in the present invention, an apparatus and method for securing buildings during high wind conditions, comprises mooring assemblies which are stowed in the building's roof and deployed prior to the onset of a hurricane or other high wind condition.

Each mooring assembly includes a cable, tightening means and ground anchor. One end of each mooring cable is permanently affixed to a structural roof member. The remainder of the cable, which includes a tightening means along its length and a detachable fastening means at its free end, is stowed in the roof for easy and quick deployment. When high wind is anticipated, the mooring cable is released from its roof stowage, the free end of the cable is fastened to a pre-installed ground anchor, and the assembly is tightened until taught.

Several such mooring assemblies are utilized to secure a given structure. The number and arrangement of the assemblies depend on the size and design of the structure.

The method of stowage of the mooring assembly in the building's roof varies depending on the type of roof employed by the structure. In the case of a pitched roof with open soffit eaves, the assembly may be stowed under the eaves in a housing attached to the roof rafter. Pitched roofs with closed soffit eaves are fitted with housing having trap doors. Alternatively, movable false bottom soffits through which the mooring cable may be deployed are used. Mooring assemblies for flat roofs and for pitched roofs with no eaves are housed inside the roof and extracted via a conduit built into the roof fascia or wall.

Where limited storage space is available for roof stowage, parts of the mooring assembly, such as the tightening means, may be stowed on the ground together with the ground anchor.

Deployment of the mooring assembly is accomplished manually with a pole and the assistance of gravity. Where manual deployment is impractical, assembly housing may be equipped with a radio frequency activated latch or other automatic release means. After release, the free end of the cable is fastened by hand to the top of the ground anchor. The mooring is tightened by means of a turnbuckle or other tightening means located at an accessible point along the length of the mooring cable.

The assembly uses commercially known and available ground anchors. Ground anchors are located around the structure in a manner that maximizes the mooring cable's ability to counterbalance the forces of the wind on the roof and building structure. One ground anchor properly placed can secure multiple mooring cables.

The ground anchors are normally placed below ground level so as not to interfere with property traffic when the mooring assembly is not deployed. Covered ground housing, used to enclose the top portion of the ground anchor as well as other stowed assembly components, further facilitates the full use of land area during times of good weather.

Further objects and advantages of this invention will become apparent from consideration of the drawings and ensuing description.

BRIEF DESCRIPTION OF THE DRAWINGS

The details of typical, but not limiting, embodiments of the present invention will be described in connection with the accompanying drawings.

DETAILED DESCRIPTION OF THE PREFERRED EMBODIMENTS

Figure 1:
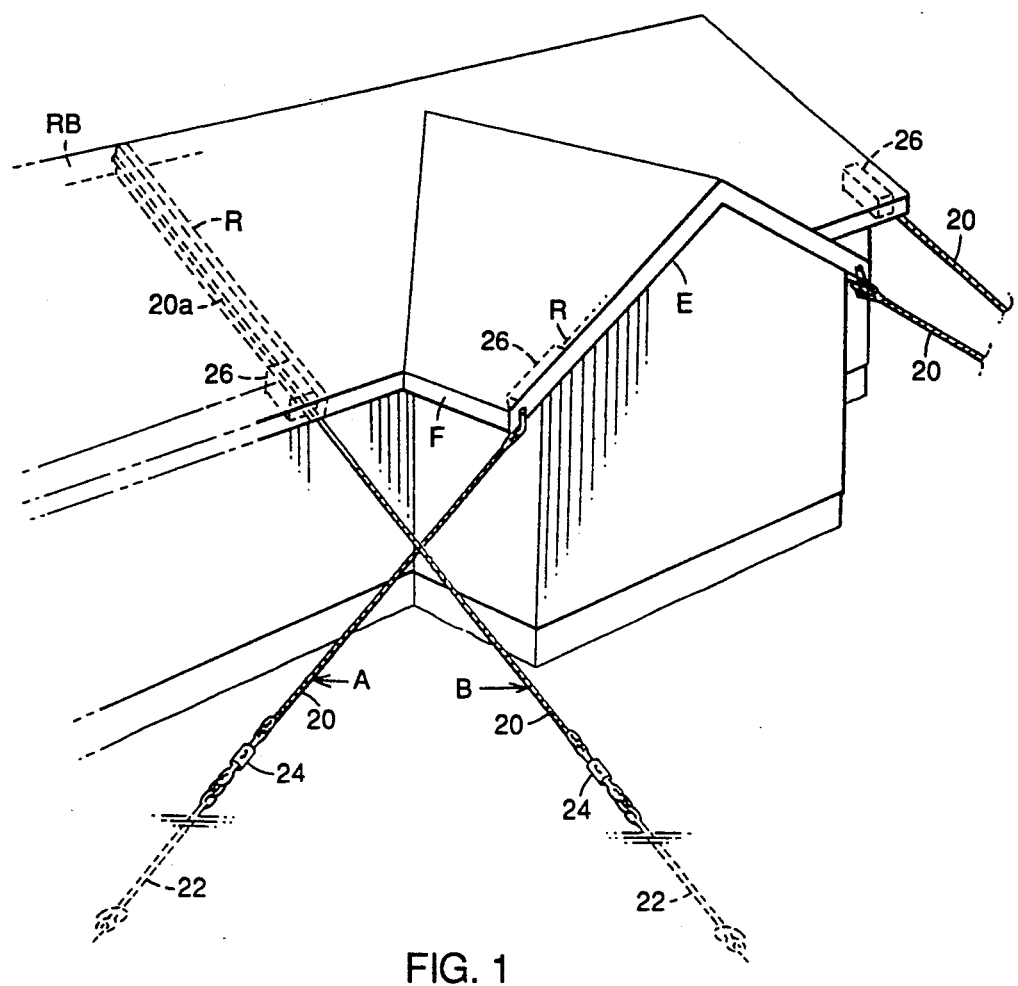
FIG. 1 is a partial perspective view showing the mooring assembly fully deployed, with method A being an assembly affixed to the end of a roof rafter and method B being an assembly affixed to a roof ridge board.

Fully deployed mooring assemblies are illustrated in FIG. 1, each of which comprise a mooring cable 20, one end of which is permanently affixed to a structural roof member, and the other end of which is engaged with a ground anchor 22. Along the length of cable 20 is a tightening means 24.

Under normal weather conditions, mooring cable 20 is stowed in a cable housing 26 located under the eaves E of the building roof. Ground anchors 22 are installed in the ground exterior to the building. Prior to the onset of high winds and inclement weather, cable 20 is deployed from housing 26, engaged with ground anchor 22, and made taught using tightening means 24.

The number and location of mooring assemblies appropriate to secure a given building vary depending on the size and configuration of the building. In FIG. 1, four mooring assemblies are visible. Other mooring assemblies, not shown, are deployed to secure the opposite sides of the building.

FIG. 1 also illustrates two methods, A and B, for affixing cable 20 to the building roof. According to method A, one end of cable 20 is permanently affixed to the eaves end of a roof rafter R. According to method B, one end of cable 20 is permanently affixed to a roof ridge board RB. Also according to method B, a section 20a of cable 20 extending from ridge board RB is secured along the length of rafter R, with the remainder of cable 20 being stowed in housing 26 available for deployment in the event of bad weather.

As can be seen method B, which utilizes more aspects of structural roof members, is a more effective means of attachment but may not be practical in all circumstances and is more expensive to implement compared with method A.

Also illustrated in FIG. 1 is placement of ground anchors 22. Ground anchors 22 are located in a manner to facilitate cable 20's ability to counterbalance the predicted forces of the wind on the roof when cable 20 is deployed and made taught. Accordingly, the arrangement and location of ground anchors 22 will depend on the a number of factors, including house design, construction, and prevailing weather conditions.

Figure 2:
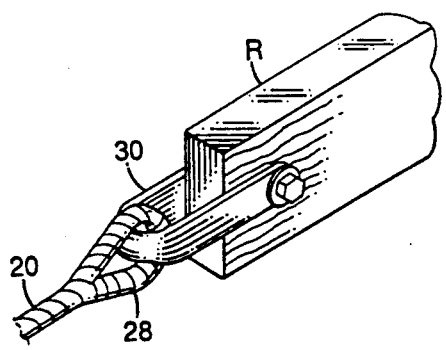
FIG. 2 is a partial perspective view showing one method for attaching the mooring cable to the end of a roof rafter.
Figure 3:
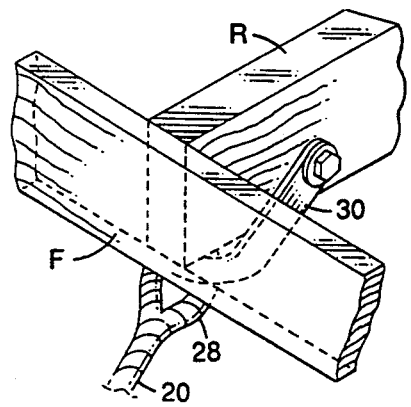
FIG. 3 is a partial perspective view showing another method for attaching the mooring cable to the end of a roof rafter located behind the roof fascia.
Figure 4:
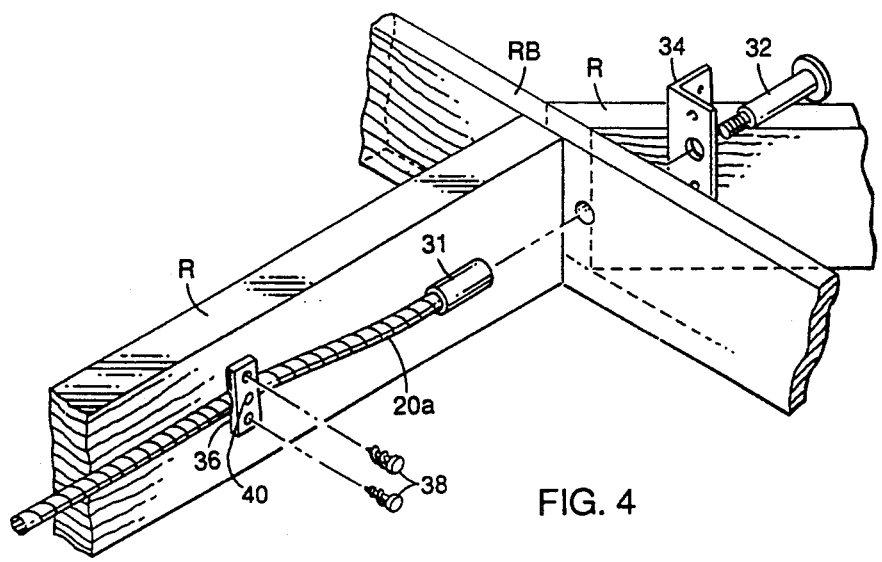
FIG. 4 is a partial perspective view showing one method for attaching the mooring cable to a roof ridge board and roof rafter.

FIGS. 2, 3 and 4 show details of different methods of permanently affixing the one end of mooring cable 20 to structural roof members.

Referring now to FIG. 2, the end of cable 20 is formed into an eye 28. Cable 20 is fastened to the eaves end of rafter R by means of a bail 30 which engages cable eye 28 and is bolted through rafter R. So configured, cable 20 may be pivoted about the end of rafter R to assume angles appropriate both for stowage and deployment.

The cable 20 depicted in FIG. 3 is similarly secured but a roof fascia F, which covers the end of rafter R, restricts the extent of pivot of cable 20 about rafter R. Where further pivot is needed, bail 30 may be bolted closer to fascia F or fascia F can be slotted to accommodate bail 30.

FIG. 4 shows mooring cable 20 secured to ridge board RB as well as rafter R in the manner described in FIG. 1 as method B. According to this preferred embodiment, one end of mooring cable 20 is fitted with a threaded swedge receiver 31. A bolt swedge 32 is inserted from the opposite side of ridge board RB, through an angle bracket 34 and ridge board RB, and screwed into swedge receiver 31. The section 20a of cable 20 which extends from ridge board RB along rafter R is secured to rafter R by means of a plurality of cable clamps 36. Cable clamp 36 is secured to rafter R using lag screws 38 and a set screw 40.

Figure 5:
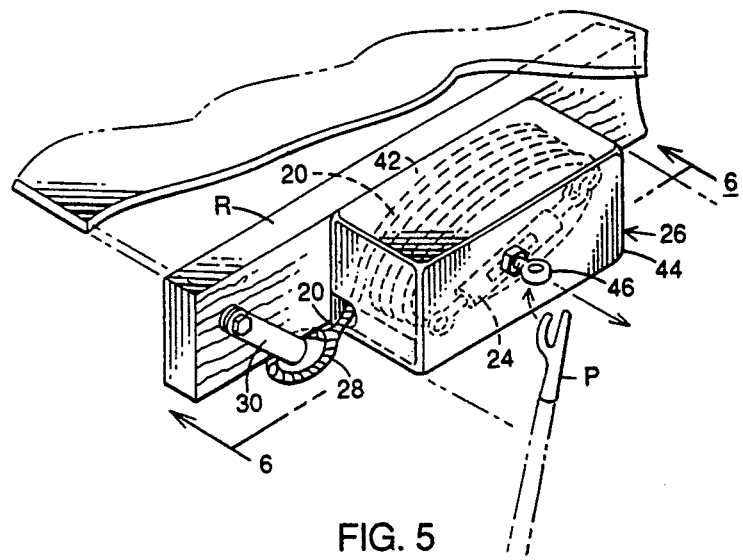
FIG. 5 is a partial perspective view of one means of stowing the mooring assembly showing the assembly stowed along side a roof rafter and housed in a box having a slip fit lid.
Figure 6:
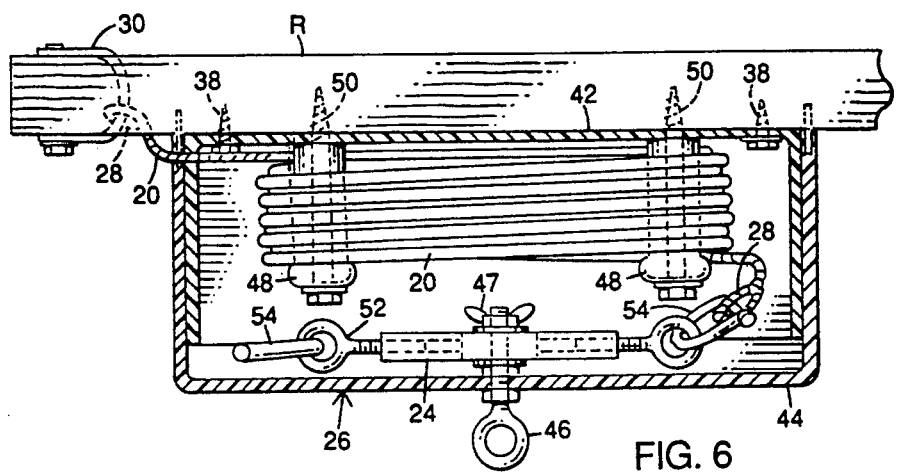
FIG. 6 is a sectional view of the assembly housing of FIG. 5, taken on line 6—6, showing the mooring cable with tightening means stowed in position.

Details of cable stowage and a preferred embodiment for cable housing 26 are illustrated in FIGS. 5 and 6. Referring first to FIG. 5, cable housing 26 is comprised of a housing base 42 and a slip fit lid 44. Base 42 and slip fit lid 44 are slotted to allow the permanently fastened end of cable 20 to pass through. Cable 20, with tightening means 24 attached to cable 20's free end, is coiled and stowed within cable housing 26. Base 42 of housing 26 is mounted on the side of rafter R in the vicinity of the eaves end of rafter R. From the center of lid 44 extends an eye bolt 46 available to engage the hook end of an extension pole P.

Deployment of cable 20 is quickly and easily accomplished by engaging the hook end of extension pole P with eye bolt 46 and lifting slip fit lid 44 away from housing base 42. Cable 20 and tightening means 24 are released from housing 26, fall downward under the force of gravity, and become available for further manual deployment.

In situations where the manual release of cable 20 is impractical, as for example where cable housing 26 must be located in a manner not accessible to extension pole P, housing 26 can be equipped with a spring-loaded latch (not shown) activated by radio frequency or other automated means.

FIG. 6 is a top sectional view of the cable housing of FIG. 5, taken on line 6—6. Housing base 42 is secured to the side of rafter R by means of a plurality of lag screws 38. Two winding posts 48 extend from the inside of housing base 42 and are secured to base 42 and rafter R by means of large lag screws 50.

Also depicted in FIG. 6 is tightening means 24 in the form of a turnbuckle. Turnbuckle 24 is fastened to the available cable eye 28 by means of a shackle 54. Another shackle 54 is fastened to the opposite end of turnbuckle 24, being thus available for easy engagement with the top of the ground anchor during deployment.

When stowed in position as shown in FIG. 6, cable 20 is wound around winding posts 48. Cable eye 28 of one end of cable 20 extends through the slot in housing base 42 and lid 44 and is pivotally secured via bail 30 to the end of rafter R. Cable eye 28 on the opposite end of cable 20 is secured to turnbuckle 24 by means of shackle 54. Eye bolt 46, which extends outward from slip lid 44, also extends inward through lid 44 to engage and hold turnbuckle 24. A wing nut 47 is used inside housing 26 to secure eye bolt 46 and turnbuckle 24 to lid 44.

According to this embodiment after slip lip 44 is lifted from base 42, lid 44 is brought downward carrying with it turnbuckle 24 and cable 20. Turnbuckle 24 is then detached from lid 44 by unscrewing wing nut 47 from eye bolt 46 and may be engaged with the ground anchor using shackle 54.

Although the embodiment depicted in FIGS. 5 and 6 illustrates housing 26 mounted on the side of rafter R, housing 26 may also be mounted on the bottom of rafter R. A number of other types and styles of housing 26 may be substituted for the shallow base-slip fit lid housing illustrated in FIGS. 5 and 6 without departing from the substance of the invention.

Figure 7:
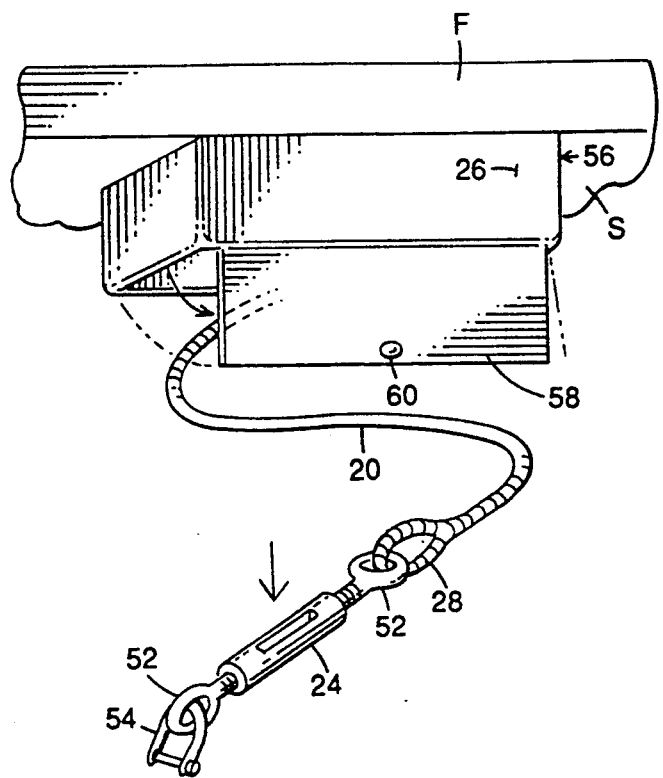
FIG. 7 is a partial perspective view of another type of assembly housing showing the housing attached to the bottom of a roof soffit and the mooring cable being deployed through an opening trap door.

Depicted in FIG. 7 is another type of housing, suitable for use with closed soffit roofs. According to this embodiment, housing 26 comprises a box shaped container 56 the top of which is affixed to the bottom of a soffit S just behind the roof fascia F. The bottom of container 56 is fitted with a trap door 58 having a latch 60 designed to be triggered by the hook end of extension pole P. As with other types of housing, container 56 may be alternatively fitted with a radio frequency activity latch (not shown) should manual release of trap door 58 be impractical.

Upon opening trap door 58 turnbuckle 24, which is not otherwise secured to container 56, falls downward pulling with it cable 20. Shown here one eye 52 of turnbuckle 24 is engaged with cable eye 28 while the opposite turnbuckle eye 52 is equipped with shackle 54 available to be fastened to the ground anchor.

Figure 8:
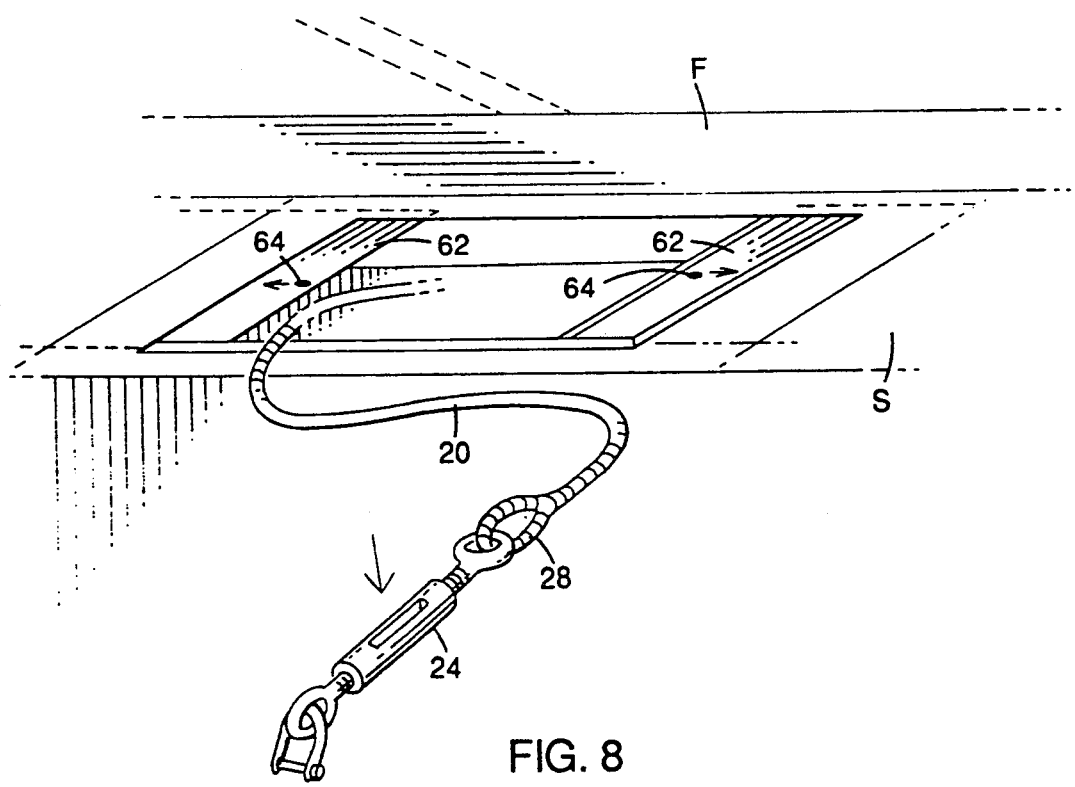
FIG. 8 is a partial perspective view of another housing for stowage of the mooring assembly, showing the mooring cable stowed loose being deployed through movable soffit panels.

Another manner of stowage suitable for use with closed soffit roofs is shown in FIG. 8. According to this embodiment, mooring cable 20, one end of which is permanently affixed to rafter R, is stowed without housing in the eaves just behind roof fascia F. Cable 20 rests on top of one or more movable panels 62 which function as roof soffits but which can be slid laterally over adjacent immovable soffits S. Panels 62 are equipped with holes 64 or alternative means to receive the hook end of extension pole P. Pushing sliding panels 62 laterally over the adjoining soffits S releases cable 20 with turnbuckle 24 which fall downward with the force of gravity and become available to be secured to the ground anchor by means of shackle 54.

FIGS. 7 and 8 illustrate one type of trap door and false bottom arrangement, respectively, suitable for stowage of mooring assemblies in structures having closed soffit roofs. Stowage means for closed soffit roofs, which employ other types of housing and release arrangements, including stowage housing recessed or built into the roof soffits, may be resorted to without departing from the substance and spirit of the subject invention.

Figure 9:
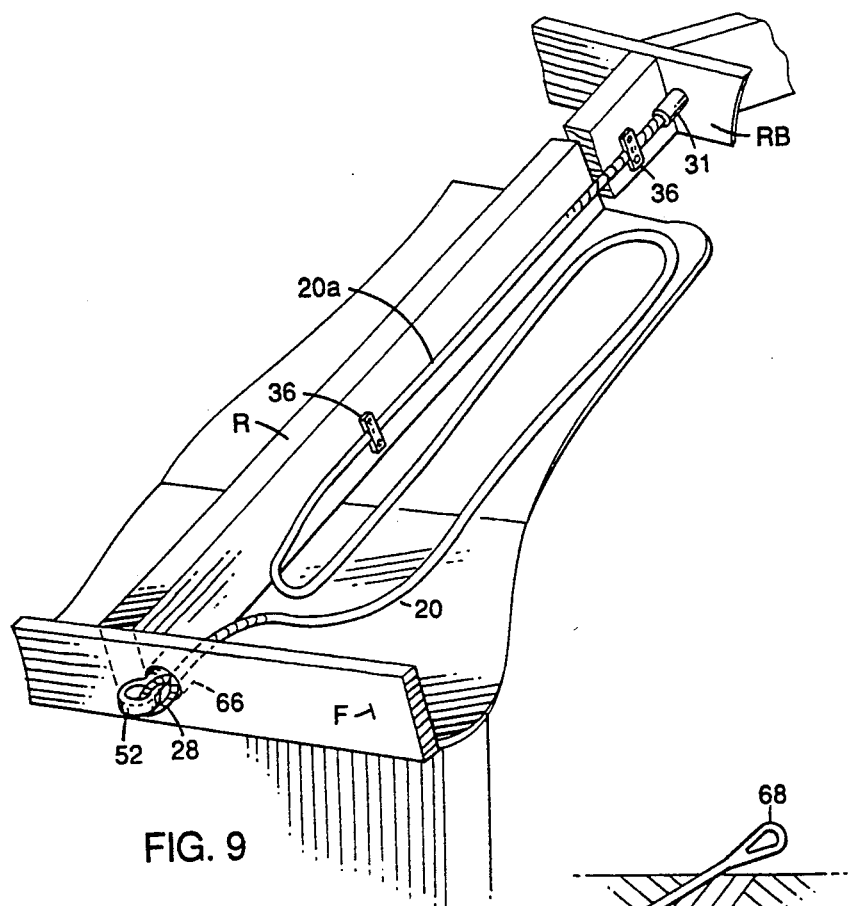
FIG. 9 is a partial perspective view of a mooring assembly stowed within the roof of a building having no eaves, the free end of the mooring cable being accessible through a conduit.

A manner of stowing mooring cable 20 intended for use with buildings having no eaves is shown in FIG. 9. One end of cable 20 is permanently affixed to ridge board RB. Portion 20a of cable 20 which extends from ridge board RB is secured along the length of rafter R with cable clamps 36. The remainder of cable 20 is stowed loose within the roof. The free end of cable 20, to which is affixed turnbuckle eye 52, is made accessible through a conduit 66 built into roof fascia F.

Also according to this embodiment the remainder of turnbuckle 24, being the turnbuckle body and another turnbuckle eye, is stowed with the ground anchor (as shown in FIG. Stowage of tightening means 24 with ground anchor 22, as opposed to with cable 20, is useful for structures having limited roof storage area.

Figure 11:
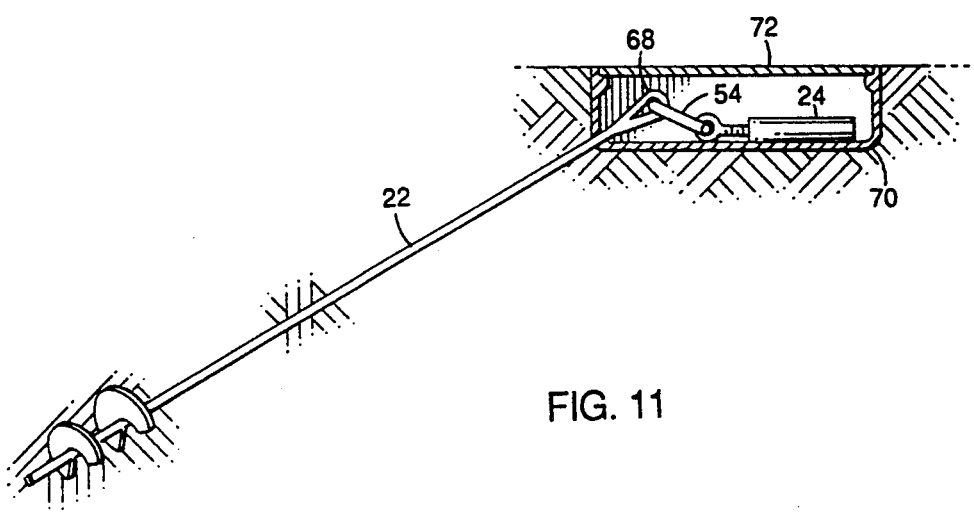
FIG. 11 is a sectional view of another mooring ground anchor, showing the top portion of the ground anchor and a tightening means attached thereto enclosed below ground level in a covered ground housing.

The cable 20 of FIG. 9 is deployed by engaging turnbuckle eye 52 with the hook end of extension pole P, or other suitable means, extracting cable 20 from conduit 66, and affixing turnbuckle eye 52 to the body of turnbuckle 24 which is stowed with and attached to ground anchor 22 (as shown in FIG. 11).

Whereas FIG. 9 depicts the free end of cable 20 having turnbuckle eye 52 available for fastening to a turnbuckle body, cable 20 could as well be equipped with shackle 54 or other detachable fastened means. Also whereas the above described figures show turnbuckle 24 composed of two turnbuckle eyes 52, jaws and hooks may be substituted for turnbuckle eyes 52 without compromising the effectiveness of the invention.

Figure 10:
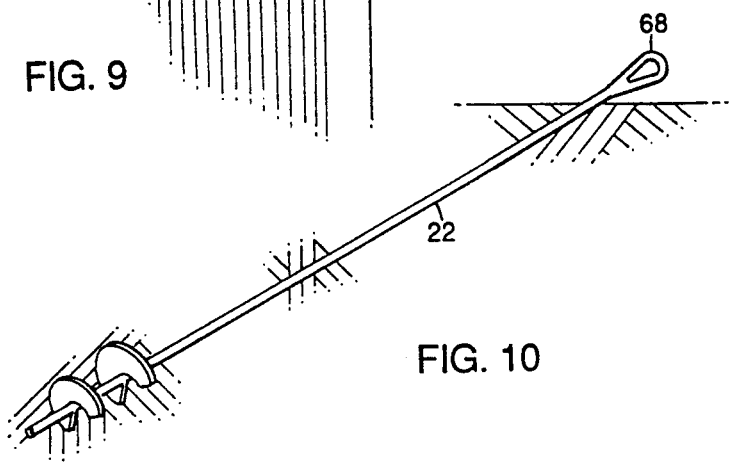
FIG. 10 is a sectional view of a mooring ground anchor, showing the top portion of the anchor extending above the ground available to engage the mooring cable.

FIG. 10 shows ground anchor 22 installed in the ground with its top exposed to receive tightening means 24 and mooring cable 20. The top of ground anchor 20 has an anchor eye 68 available to receive shackle 54 or equivalent means for detachably securing cable 20 or tightening means 24 to anchor 22.

The ground anchor 22 depicted in FIG. 10 is a helical ground anchor. Other types and varieties of commercially available ground anchors may be substituted for the helical ground anchor depicted without departing from the substance or spirit of the invention.

Ground anchors 22 which extent above ground level, as illustrated in FIG. 10, can interfere with property traffic and restrict property utility. A ground anchor which does not extend above ground level, thereby avoiding the aesthetic and spacial problems occasioned by the ground anchor of FIG. 10, is illustrated in FIG. 11. According to this alternative embodiment the entire of ground anchor 22 is submerged below ground, with its top portion enclosed in a ground housing 70. The top of the ground anchor is made accessible through a ground level cover 72 of sufficient strength to support property traffic and other activities.

According to the mooring assembly shown in FIG. 11, turnbuckle 24 is affixed to anchor eye 68 by means of shackle 54 and stowed in ground housing 70 together with ground anchor 22. Lifting cover 72 of ground housing 70 exposes turnbuckle 24 which is then available to engage turnbuckle eye 52 that is being stowed in the roof together with cable 20 (as shown in FIG. 9).

Stowage of tightening means 24 together with ground anchor 22 is well suitable for buildings without eaves, as for example the building illustrated in FIG. 9. However stowage of tightening means 24 in the ground as opposed to in the roof is an available option for all the preferred embodiments described above and for all varieties of buildings and roofs. A portion of cable 20 can also be stowed in ground housing 70, as for example where ground storage is more available than roof storage.

Whereas FIG. 11 shows submerged ground anchor 22 stowed together with tightening means 24, submerged ground anchors can equally well be used with embodiments having tightening means stowed in the roof together with mooring cable 20.

Also, whereas all embodiments illustrated show tightening means 24 joining mooring cable 20 to ground anchor 22, tightening means 24 can alternatively be located at an intermediate point along the length of cable 24 and cable 20 joined directly to ground anchor 22.

Furthermore, although the embodiments illustrated show each mooring cable 20 having its own ground anchor 22, a single ground anchor 22 can secure more than one mooring cable 20.

SUMMARY AND SCOPE

Accordingly, it will be readily appreciated that the mooring assembly of the present invention is flexible enough to be employed with all types of buildings. When properly installed and stowed in the building's roof, the assembly is available for quick and easily deployment in the event of a hurricane or other high wind condition such that these systems can even be used by the elderly without tools and without the assistance of others.

The mooring assembly, when deployed, fastened to the ground anchor and tightened, strengthens the structure against high winds by counterbalancing the forces produced by the wind on the roof and the building structure. The deployed cable is effective to transfer the uplift loads produced by the wind on the roof to the ground through natural load paths.

The present invention preserves the aesthetics of the structure because the mooring assembly is deployed and visible only during periods of bad weather. Maximum interior usable space is preserved because the assembly can be practiced on conventionally shaped structures. Maximum exterior usable space is preserved because no cables or other apparatus are present to obstruct activities during periods of good weather.

Another advantage of the mooring assemblies of this invention is that they can be constructed and installed without complexity or excessive expense. Mooring assemblies may be installed in new buildings at the time of construction, and existing structures can be easily retrofitted to incorporate the mooring assemblies. Buildings so equipped can be expected to qualify for discounted insurance premiums, saving their owners considerable problem and expense over the long term.

The manner and methods of stowage of the mooring assembly within the roof facilitates its quick and easy deployment. Use of turnbuckle assemblies and equivalent tightening means, as well as shackles, wing nuts and equivalent detachable fastening means, enables the assembly to be fastened and tightened in a very short period of time, with little strength and a minimum, if any, tools. Accordingly, a single individual can fully deploy a number of mooring assemblies of the present invention without substantial effort and with little warning of inclement weather, making the invention even useful for elderly persons living alone in remote areas.

Although the description above contains many specifications, these should not be construed as limited the scope of the invention but as merely providing illustrations of some of the presently preferred embodiments of this invention. For example the mooring cable could alternatively be described as a strap or belt and be composed of nylon or rope; the tightening means could be a system of knots or buckles, etc.

Thus the scope of the invention should be determined by the appended claims and their legal equivalents, rather than by the examples given.

The embodiments of the invention which an exclusive property or privilege is claimed are defined as follows:

1. A mooring assembly for securing buildings during high wind conditions comprising:
   (a) a mooring cable one end of which is permanently fastened to a structural roof member of a building and the other end of which is fitted with a detachable fastening means;
   (b) a ground anchor installed in the ground exterior to said building having a top portion available to accept the free end of said mooring cable;
   (c) wherein said mooring cable is stowed within the roof of said building to be deployed and engaged with said ground anchor during times of high wind.

2. A mooring assembly according to claim 1 further comprising a tightening means located along the length of said mooring cable enabling said cable to be tightened after engagement with said ground anchor.

3. A mooring assembly according to claim 1 wherein said top portion of said ground anchor is housed below ground in a compartment.

4. A mooring assembly according to claim 1 wherein said detachable fastening means is a shackle with pin.

5. A mooring assembly according to claim 2 wherein said tightening means is a turnbuckle assembly.

6. A mooring assembly according to claim 1 wherein:
(a) said permanently fastened end of said mooring cable is affixed to the eaves end of a roof rafter by an attaching means which allows said cable to pivot about said rafter end;
(b) the remainder of said cable is stowed in the vicinity of said rafter end for quick and easy deployment.

7. A mooring assembly according to claim 6 wherein said attaching means is a bail and bolt.

8. A mooring assembly according to claim 1 wherein:
(a) said permanently fastened end of said mooring cable is affixed to a roof ridge board;
(b) the portion of cable extending from said ridge board is affixed along the length of a roof rafter to the eaves end of said roof rafter;
(c) the remainder of said cable is stowed in the vicinity of said rafter end for quick and easy deployment.

9. A mooring assembly according to claim 1 further comprising a housing installed under the eaves of an open soffit roof for stowage of said mooring cable.

10. A mooring assembly according to claim 9 wherein said housing is a box fitted with a slip fit lid designed to engage an extension pole.

11. A mooring assembly according to claim 9 wherein said housing is a box formed by said roof member, sides and trap door with latch.

12. A mooring assembly according to claim 9 wherein said housing is a box having a trap door equipped with a radio frequency activated release latch.

13. A mooring assembly according to claim 1 wherein said mooring cable is stowed within the eaves of an closed soffit roof.

14. A mooring assembly according to claim 13 wherein the roof is equipped with movable panels which may be pushed aside to release said stowed mooring cable.

15. A mooring assembly according to claim 1 further comprising a housing installed within the soffits of a closed soffit roof for stowage of said mooring cable.

16. A mooring assembly according to claim 15 wherein said housing is equipped with a trap door and latch for release of said mooring cable.

17. A mooring assembly according to claim 1 wherein said mooring cable is stowed within the roof of a building having no eaves and the free end of said cable is made accessible for deployment through a conduit.

18. A mooring assembly according to claim 1 further comprising a tightening means affixed to the top portion of said ground anchor available to engage and tighten said cable upon deployment.

19. A method for securing buildings during high wind conditions comprising:
(a) permanently fastening one end of a plurality of mooring cables to structural roof members;
(b) affixing detachable fastening means to the opposite ends of said mooring cables;
(c) stowing said mooring cables within the roof of said building;
(d) installing a plurality of ground anchors in the ground exterior to said building with the top portion of said anchors available to accept the free ends of said mooring cables;
(e) deploying said mooring cables from the roof and detachably fastening the free ends of said cables to the top portion of said ground anchors during periods of high wind.

20. A method for securing buildings according to claim 19 further comprising tightening means located along the length of said mooring cables and using said tightening means to make said mooring cables taught after deployment.

21. A method for securing buildings according to claim 19 further comprising housing for stowage of said mooring cable within the roof of said buildings.

* * * * *